United States Patent

Oeckl

[15] 3,640,634
[45] Feb. 8, 1972

[54] TOOL CHANGER FOR MACHINE TOOLS

[72] Inventor: Otto Oeckl, Tizianstrasse 60, 8000 Munich 19, Germany

[22] Filed: Oct. 14, 1969

[21] Appl. No.: 866,269

[30] Foreign Application Priority Data

Oct. 25, 1968 Germany.....................P 18 05 343.5

[52] U.S. Cl. ....................................408/35, 29/26, 29/568
[51] Int. Cl. ..........................................................B23b 39/20
[58] Field of Search ..................77/25; 90/17; 29/39, 40, 26, 29/568; 408/35

[56] References Cited

UNITED STATES PATENTS

| | | | |
|---|---|---|---|
| 2,307,222 | 1/1943 | Johnson | 90/17 |
| 2,682,698 | 7/1954 | Berthiez | 29/40 |
| 3,023,677 | 3/1962 | Charlat | 77/25 X |
| 3,238,615 | 3/1966 | Leone et al. | 29/568 |
| 3,359,861 | 12/1967 | Johnson et al. | 90/17 |

*Primary Examiner*—Andrew R. Juhasz
*Assistant Examiner*—Z. R. Bilinsky
*Attorney*—Francis D. Stephens and Hugo Huettig, Jr.

[57] ABSTRACT

The headstock of a machine tool carries two spindles alternately turnable from a tool-working to a tool-changing position. In addition, the headstock is turnably mounted on the machine tool body so that the spindle in tool-changing position is always aligned with a tool magazine even when the spindle in working position is inclined to the vertical.

1 Claims, 1 Drawing Figure

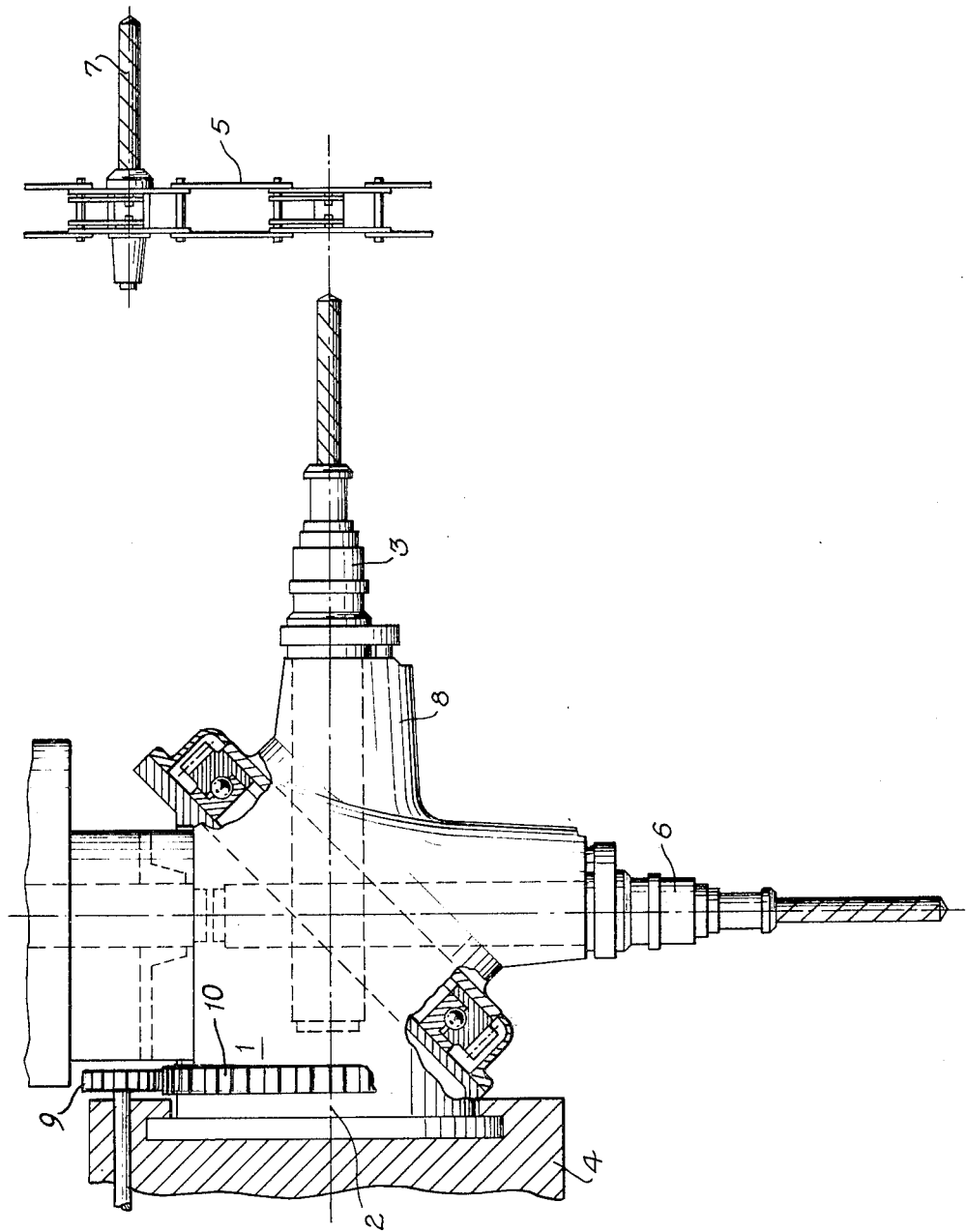
INVENTOR
Otto Oeckl

TOOL CHANGER FOR MACHINE TOOLS

This invention relates to an apparatus for changing the tools on a machine tool. THis invention is an improvement upon the copending application of Oeckl et al., Ser. No. 719,598, filed 8 Apr. 1968, for "Tool Changer for Machine Tools" now U.S. Pat. No. 3,544,286.

In the aforesaid application, the machine tool has two spindles whose longitudinal axes extend at an angle to each other with the spindles being mounted so that they can be turned alternately from the working position to a tool changing position.

In the aforesaid application, in order to quickly and easily place a spindle in tool changing position, the two spindles lie in separate planes, one behind the other, which planes are parallel to a plane through the turning axis so that the spindle which is in tool changing position is axially displaced and thus brought into a position adjacent the tool magazine.

The aforesaid application also discloses that the headstock which forms the turning base for the spindles is positioned on a rotary disc so that the working position of the spindle can be in any desired direction with respect to the plane of the disc. This makes it absolutely necessary that the tool magazine is rigidly attached to the headstock. If such were not the case, as for example when a tool magazine is independent of the headstock, it is not possible to change the tool when the working spindle is inclined to the vertical since the direction of movement of the spindle in tool changing position no longer coincides with the alignment for removing tools from the magazine. Also, a tool magazine mounted on the headstock has the further disadvantage that it is only possible to store a limited number of tools due to lack of space.

The object of this invention is to avoid the aforesaid disadvantages and to make possible the storage of numerous tools in a tool magazine that is independent of the headstock holding the spindle and is of any desired size. A further object is to make possible the changing of the tool in a spindle in tool changing position even when the working spindle is inclined to the vertical.

In general, these and other objects of this invention are obtained in that the headstock which forms the base for turning the spindle is mounted to be rotatable about the longitudinal axis of the spindle in tool-changing position.

The arrangement of this invention has the principal advantage in that, because the headstock can be turned around the longitudinal axis of the tool in tool changing position, the working spindle can be inclined at any angle to the vertical or can even be horizontal without changing the direction of the longitudinal axis of the tool in tool changing position. By reason of this arrangement, it is no longer necessary to rigidly connect the tool magazine to the headstock and therefore it is no longer necessary to limit the size of the tool magazine.

The means by which the objects of this invention are obtained are described more fully with reference to the accompanying drawing which shows a side view of the tool changing apparatus, partly in cross section.

As in the aforesaid application Ser. No. 719,598, the spindle 3 in tool changing position and the spindle 6 in working position are positioned crosswise in spindle head 8 which is rotatably mounted in the headstock 1. In turn, the headstock 1 is rotatably mounted on the machine body 4 for being turned around the longitudinal axis 2 of the spindle when the latter is in tool changing position. Turning of the headstock 1 around the axis 2 may be effected by means of meshing gears 9 and 10. Gear 9 may be driven by any suitable means mounted in the machine body 4. Other conventional means may be used as such means are well known in the machine tool art. The mechanism for operating the spindles is placed in the headstock vertically above the working spindle as disclosed in application Ser. No. 719,598. By turning the headstock 1 around the longitudinal axis 2, the direction of the working spindle is changed so that it can be inclined to the vertical, but the relative position off spindle 3 with regard to tool magazine 5 is unchanged so that a tool change can be made in the same manner as disclosed in Ser. No. 719,698. Consequently, magazine 5 can carry any desired number of tools 7.

Having now described the means by which the objects of this invention are obtained, I claim:

1. A quick changing machine tool comprising a fixed machine tool body, headstock means mounted on said body and rotatable about an axis, a tool magazine mounted in fixed relation to said axis about which said headstock means is rotatable to selectively present a tool in axial alignment with said axis, drive shaft means mounted on said headstock, said drive shaft means having its axis of rotation lying in a plane normal to the axis of rotation of said headstock means, and a turret mounted on said headstock means to rotate about an axis intersecting the lane in which said drive shaft lies at an angle of 45° to said plane, said turret being provided with at least two spindles so positioned in said turret that when one said spindle is in alignment with said drive shaft means the other said spindle lies in axial alignment with the axis about which said headstock is rotatable, whereby the other said spindle is positioned in tool-changing position with respect to said tool magazine.

* * * * *